United States Patent
Kashio et al.

Patent Number: 6,037,081
Date of Patent: Mar. 14, 2000

[54] EXPANDED GRID FOR ELECTRODE PLATE OF LEAD-ACID BATTERY

[75] Inventors: Go Kashio; Yasuyuki Yoshihara, both of Aichi, Japan

[73] Assignee: Matsushita Electric Industrial Co., Ltd, Osaka, Japan

[21] Appl. No.: 09/150,537

[22] Filed: Sep. 9, 1998

[30] Foreign Application Priority Data

Sep. 9, 1997 [JP] Japan .................................. 9-243828

[51] Int. Cl.⁷ .................................................. H01M 4/14
[52] U.S. Cl. .......................... 429/242; 429/225; 429/226; 429/233; 429/241
[58] Field of Search ................................ 429/225, 226, 429/233, 241, 242, 218.1; 29/2; 83/903

[56] References Cited

U.S. PATENT DOCUMENTS

| | | | |
|---|---|---|---|
| 3,933,524 | 1/1976 | Hughel et al. | 136/64 |
| 4,456,579 | 6/1984 | Rao et al. | 420/566 |
| 4,761,356 | 8/1988 | Kobayashi et al. | |
| 4,805,277 | 2/1989 | Yasuda et al. | 29/2 |
| 4,906,540 | 3/1990 | Hoshihara et al. | 429/242 |
| 4,939,051 | 7/1990 | Yasuda et al. | |
| 5,120,620 | 6/1992 | Nelson et al. | 429/225 |
| 5,948,566 | 9/1999 | Larsen et al. | 429/225 |
| 5,958,625 | 9/1999 | Rao | 429/241 |

FOREIGN PATENT DOCUMENTS

| | | |
|---|---|---|
| 252 189 | 1/1988 | European Pat. Off. . |
| 61-200670 | 9/1986 | Japan . |
| 4-81307 | 12/1992 | Japan . |
| 86/03343 | 6/1986 | WIPO . |

OTHER PUBLICATIONS

European Search Report dated Dec. 28, 1998, application No. 98301203.

*Primary Examiner*—Maria Nuzzolillo
*Assistant Examiner*—Monique Wills
*Attorney, Agent, or Firm*—Ratner & Prestia

[57] ABSTRACT

A slit is formed in a clad sheet integrating a thin layer of lead alloy containing at least one of tin and antimony at least on one side ot a parent material made of lead or lead-calcium system alloy. The clad sheet is processed by expanding to twist the rib of the formed grid, and the thin layer of the lead alloy containing at least one of tin and antimony is spirally oriented in multiple directions, as the positive electrode plate. An expanded grid is thus formed. In this manner charging reception characteristics after long-term storage following deep discharge at high temperature ot a lead-acid battery are improved.

3 Claims, 3 Drawing Sheets

EXPANDED GRID FOR ELECTRODE PLATE OF LEAD-ACID BATTERY

FIELD OF THE INVENTION

The present invention relates to an expanded grid for a positive electrode plate of lead-acid battery, and more particularly to an improvement of battery characteristics and life characteristics of a lead-acid battery by using this grid.

BACKGROUND OF THE INVENTION

In a lead-acid battery, a paste type electrode plate filled with paste mainly composed of lead powder or lead oxides such as litharge (PbO) is mostly used in the grid made of lead (Pb) or Pb alloy. As the grid, hitherto, a casting grid has been widely used. Recently, however, a paste type electrode plate using an expanded grid is being widely used because of its excellent mass producibility. The paste type electrode plate using the expanded grid is suited to a thin electrode plate, and it is appropriate for composing a battery for an automobile or an electric vehicle in which heavy load discharge characteristics are typically required.

As the Pb alloy for the grid, a lead-antimony (Pb—Sb) system and a lead-calcium (Pb—Ca) system are representative alloys.

The Pb—Sb system alloy is smooth in flow of molten alloy in casting, and excellent in casting performance, and is also high in mechanical strength of the grid. Hence it has been a common casting grid. However, when the Pb—Sb system alloy high in Sb content is used in the positive electrode grid, Sb dissolving from the alloy into the electrolyte deposits on the negative electrode surface. Since Sb is low in hydrogen overvoltage and is likely to generate hydrogen, it causes a decrease in the electrolyte amount when charging or overcharging. Recently, accordingly, there is a tendency of using the so-called low antimony lead alloy having the Sb content in the Pb—Sb system alloy decreased to about 2.5 wt. % of the allowable range of mechanical strength (about half of the conventional content), in the positive electrode plate.

By contrast, in the battery using the grid made of Pb—Ca system alloy, the advantage is the small extent of decrease of electrolyte amount by charging and discharging cycle and self-discharge in charged state. Casting performance, however, has been poor, the crystal particle size of alloy is larger than in the Pb—Sb system alloy and corrosion resistance is lowered, and the mechanical strength of the grid after casting is low. Accordingly, the casting grid by Pb—Ca system alloy has been limited to small-size batteries only.

On the other hand, as the Pb—Ca system alloy for expanded grid, hitherto, the Pb—Ca—Sn alloy adding tin (Sn) by about 0.25 wt. % has been generally used for positive and negative electrode plates. The battery using this alloy grid, when charged at constant voltage following a long-term standing after discharge, reaches the setting voltage in an extremely short time, and is substantially sometimes unable to charge. The cause of such phenomenon is known to exist in the positive electrode. That is, the sulfuric acid in the electrolyte is consumed by discharge, and the electrolyte near the positive active material becomes neutral. When stored for a long-term in this state, a passive layer expressed by $PbO_x$ (x=1 to 1.5) is formed in the interface between the grid and the active material in the positive electrode, and the internal resistance of the battery increases, which is considered to cause this phenomenon.

Also in the battery using the expanded grid made of Pb—Ca system alloy in the positive electrode plate, when charging and discharging by constant voltage charging are repeated at a high temperature of 40° C. or more, in particular, over 70° C., the positive electrode is changed in shape due to stretch by corrosion of the grid, and decreased in capacity due to softening or drop-out by lowering of binding force between active material particles. In the negative electrode, too, decrease of capacity due to shrinkage by increase ot particle size ot active material is noted. Such phenomenon is observed not only in the Pb—Ca system alloy, but also in the grid using pure Pb.

To suppress formation of the passive layer between the grid of pure Pb or Pb—Ca system alloy and the active material in the positive electrode, it is known that increase of the content of Sn or Sb in the pure Pb or Pb—Ca system alloy is effective. However, when the content of Sn or Sb is increased, the alloy price is raised, and the battery manufacturing cost is increased. Moreover, when the total Sn content is increased, an internal short circuit is caused by dissolution and deposition of Sn, which causes a decrease of the cycle life. And, by increasing the total content of Sb, as mentioned above, Sb is dissolved and Sb precipitates on the negative electrode, and the electrolyte amount is decreased due to charging and discharging cycles, and self-discharge increases.

It was hence attempted to suppress the formation ot the passive layer by raising the Sn and/or Sn content in part of the grid surface contacting with the active material in the positive electrode. More specifically, a sheet of Pb—Sn alloy is overlaid on a Pb—Ca system alloy parent material, and integrated by cold rolling process to obtain a clad sheet, from which a grid is manufactured by expanded processing or perforated processing, as disclosed in Japanese Patent Publication No. Hei04-81307, and a Pb—Sn alloy or Pb—Sn—Sb alloy layer with Sb concentration of 0.3 wt. % or less is formed on a Pb—Ca system alloy parent material, and then a Pb—Sb alloy or a Pb—Sn—Sb alloy layer with Sb concentration of 0.8 wt. % or more is integrally formed thereon to obtain a clad sheet, from which a grid is manufactured by expanded processing or perforated processing, as disclosed in Japanese Laid-open Patent Application No. Sho61-200670.

By using these grids in the positive electrode plate, while maintaining the advantages of the conventional Pb—Ca system alloy grid in which decrease of electrolyte amount due to charging and discharging cycles and self-discharge are suppressed, it was expected that these grids would be an effective means for solving a number of problems. The problems expected to be solved relate to charging reception characteristic after long-term storage following deep discharge, shape change of grid in the positive electrode, and decrease of capacity of positive and negative electrodes by charging and discharging cycles at high temperature.

However, these effects were not sufficiently addressed by these grids, and the degree of which the effects were addressed may vary.

SUMMARY OF THE INVENTION

A thin layer of Pb alloy containing at least one of Sn and Sb is formed at least on one side of a parent material made ot Pb or Pb—Ca system alloy, and integrated to obtain a clad sheet. Then, it is slit and expanded to twist the rib of the formed grid. The thin layer portion of Pb alloy containing at least one of Sn and Sb is spirally directed in multiple directions, and such an expanded grid for the electrode plate of a lead-acid battery is used in the positive electrode. As a result, problems in the pure Pb or Pb—Ca system alloy used in the conventional expanded grid, such as charging reception characteristics after long-term storage following deep discharge especially at high temperature, shape change of grid in the positive electrode, and decrease of capacity of positive and negative electrodes by charging and discharging cycles at high temperature, can be effectively solved by Sn and Sb in the alloy thin layers of Pb—Sn, Pb—Sb and Pb—Sn—Sb cladded on the parent material of pure Pb or Pb—Ca system alloy, and fluctuations of effects can be successfully suppressed.

BRIEF DESCRIPTION OF THE DRAWINGS

FIG. 1(a) is a general external side view, and FIG. 1(b) is a partially enlarged perspective view.

DETAILED DESCRIPTION OF THE PREFERRED EMBODIMENT

The invention is described below by referring to an exemplary embodiment together with the accompanying diagrams.

Figure 1A:
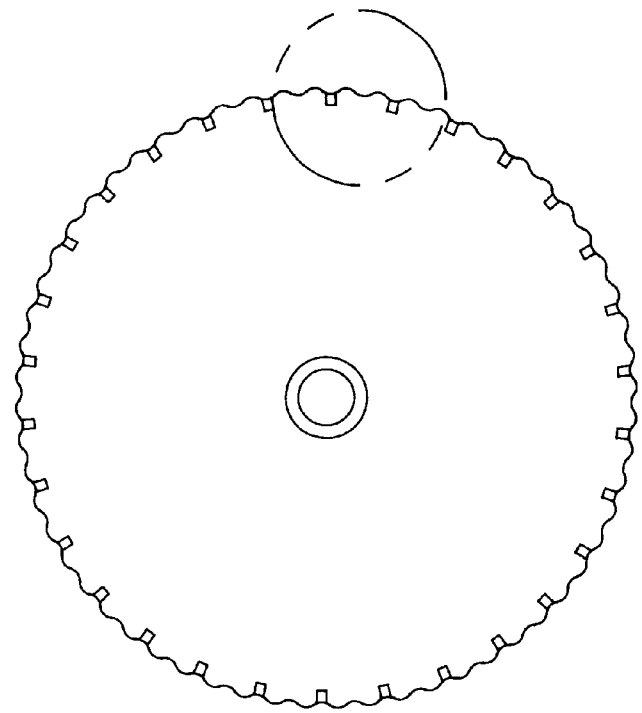
FIGS. 1(a) and 1(b) show a die for a rotary slitter for manufacturing an expanded grid.
Figure 1B:
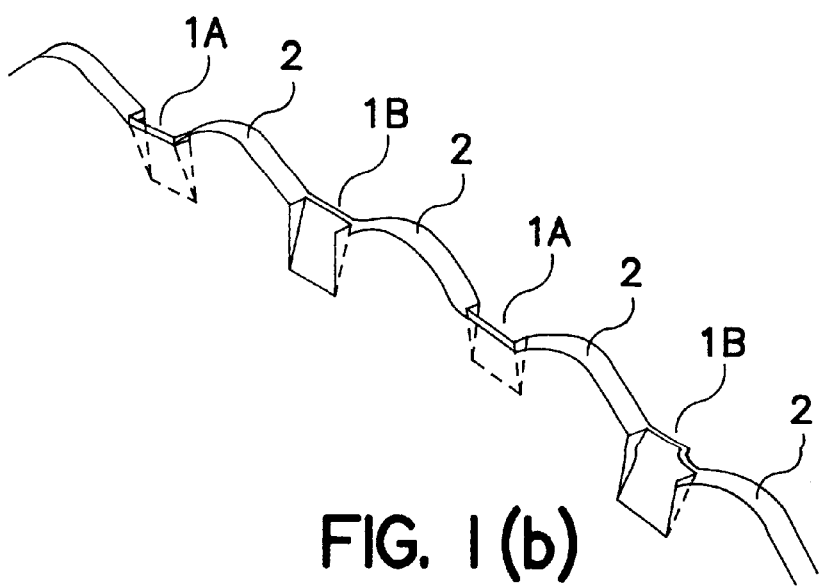

Methods of forming a slit in the sheet of Pb or Pb—Ca system alloy include a reciprocating process and a rotary process. A general external side view of a die for a rotary slitter is shown in FIG. 1(a), and a partially enlarged perspective view of a die for rotary slitter is shown in FIG. 1(b). In FIG. 1(b), dies 1A and 1B of the rotary slitter are clearance portions in which slit is not formed, at the intersection of the lath for forming the grid by expanded processing. The higher portion B for forming the rib of the grid is shown.

When both ends of a sheet of Pb or Pb—Ca system alloy having a specified slit is pulled by an expander to push open so as to expand the sheet width, a grid of lath mesh is formed. By using a clad sheet integrated by overlaying and cold rolling a sheet of Pb alloy containing at least one of Sn and Sb on a parent material of Pb or Pb—Ca system alloy, in the process of expanding to push open after forming a specified slit, if the degree of expanding is low, the thin layer of Pb alloy containing at least one of Sn and Sb is directed in one direction only. By contrast, when the degree of expanded processing is heightened, the rib of the lath mesh grid is twisted. As a result, the thin layer of Pb alloy containing at least one of Sn and Sb is spirally directed in multiple directions.

Figure 2:
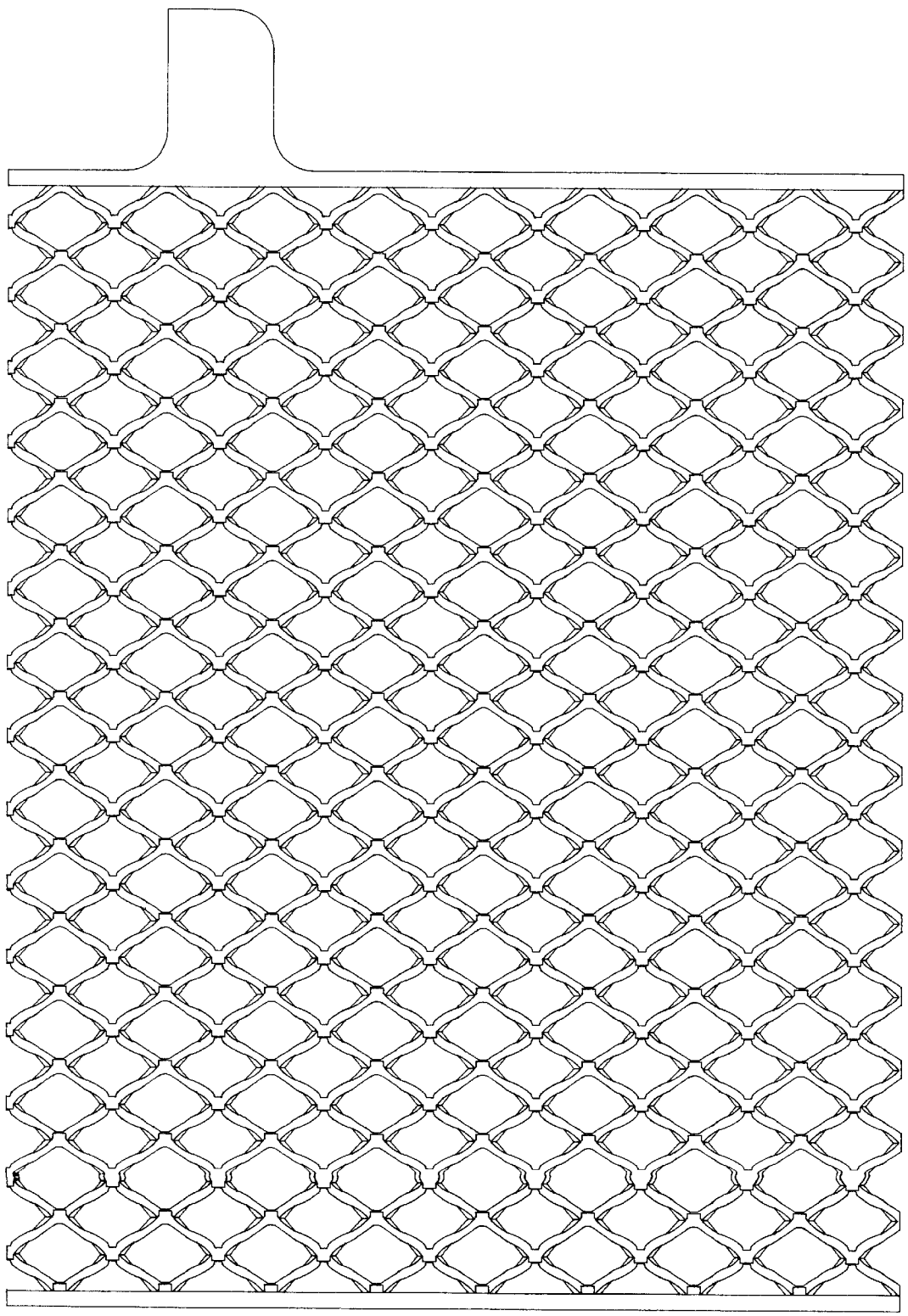
FIG. 2 is a representative external plane view of an expanded grid per positive electrode plate in an exemplary embodiment of the invention.
Figure 3:
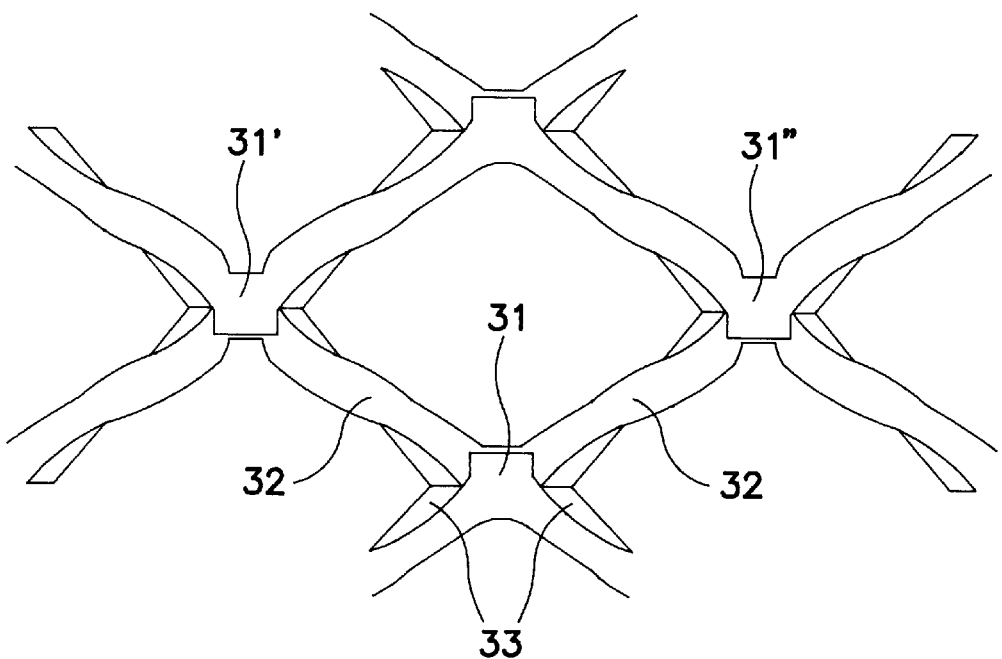
FIG. 3 is a partial enlarged view of the expanded grid in the exemplary embodiment of the invention.

FIG. 2 is a representative external plane view of an expanded grid for the portion of one positive electrode plate in an exemplary embodiment of the invention, and its partial enlarged view is shown in FIG. 3.

In FIG. 3, the rib 32 of the grid between intersections 31 and 31' and intersections 31 and 31" of the expanded grid is twisted. As a result, the thin layer 33 of Pb alloy containing at least one of Sn and Sb is spirally directed in multiple directions.

In the lead-acid batteries at different degrees of expanded processing, charge and discharge were repeated after long-term storage following deep discharge, and the capacity recovery characteristics by charging reception characteristics were compared.

As the Pb—Ca system alloy as the parent material, a Pb alloy in the composition containing 0.07 wt. % of Ca and 0.025 wt. % of Sn was selected. On one side of the parent material, a Pb alloy sheet containing Sn by 5 wt. % was overlaid, and was integrated by cold rolling process by multi-stage rollers, and a clad sheet of 1.0 mm in thickness was fabricated. Using this clad sheet, after forming a specified slit, it is processed by expanding. The expanded grid of which Pb-Sn alloy thin layer is directed in one direction only due to low degree of expanding is the conventional product, and the expanded grip of which Pb—Sn alloy thin layer is directed spirally in multiple directions owing to high degree of expanding relates to the invention. Using both expanded grids, by the paste type electrode plate method, a sealed type lead-acid battery with nominal 12 V, 60 Ah was fabricated. In both grids, the negative electrode plate was a paste type electrode plate by expanded grid formed from the parent alloy mentioned above.

Figure 4:
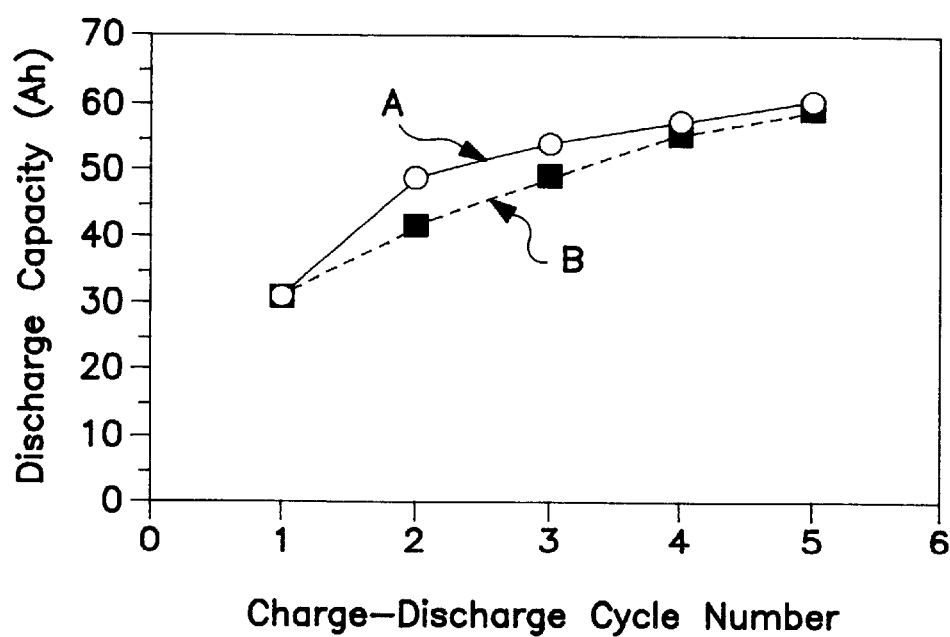
FIG. 4 is a comparative diagram of capacity recovery characteristics of the prior art and an exemplary embodiment of the invention by charging and discharging cycles after long-term storage following deep discharge.

Using the trial battery products, the battery storage and capacity recovery were tested. In the testing method, after storing for 90 days at 45° C., the batteries were discharged at 20 A until 9.9 V at 25° C., and were charged in two stages at rated current. In the two-stage charging at rated current, the first stage was 12 A until 14.4 V, and the second stage was 3 A and 4 hours. The increase of discharge capacity by charging and discharging cycles was evaluated as recovery of capacity. The results are shown in FIG. 4. In FIG. 4, the battery in the exemplary embodiment of the invention is indicated by A, and the battery of the prior art is B. As understood from FIG. 4, it is evident that the battery A in the exemplary embodiment of the invention is superior in the recovery characteristic of the discharge capacity compared with the prior art battery B.

In the exemplary embodiment of the invention, as the Pb alloy to be overlaid on the parent material of Pb—Ca system alloy, an example of a thin layer of a Pb—Sn alloy is mentioned, but similar effects are obtained by thin layers of Pb—Sb alloy and Pb—Sn—Sb alloy. In the expanded grid of the prior art, the lead alloy thin layer containing at least one of Sn and Sb is directed in one direction only, and the suppressing effect of the passive layer formed in the interface of the grid surface and the active material in the positive electrode is only local, and the capacity seems to be hardly recovered. By contrast, in the expanded grid in the exemplary embodiment of the invention, since the lead alloy thin layer containing at least one of Sn and Sb is directed spirally in multiple directions, it is judged that suppression of the passive layer formed in the interface of the grid surface and active material is directed in multiple directions and takes effect at multiple positions.

In the exemplary embodiment of the invention, the Pb alloy thin layer containing at least one of Sn and Sb is formed on one side of the Pb—Ca system alloy parent material, but a higher effect is obtained by forming a Pb alloy thin layer on both sides of the parent material made of Pb—Ca system alloy. It is also effective to form a Pb—Sn alloy thin layer on one side, and a Pb—Sb alloy thin layer on the other side.

The parent material of the clad sheet is not limited to the Pb—Ca system alloy. Pure Pb as the parent material is similarly effective.

A content of Sn and Sb in the Pb alloy sheet overlaid on the parent material made of Pb or Pb—Ca system alloy of at least 1.0 wt. %, is effective. However, if the content of Sn and Sb in the Pb alloy sheet is too high, it is hard to integrate with the parent material by cold rolling, and Sn and Sb may dissolve to cause internal short circuit and increase of self-discharge. Therefore, in both Sn and Sb, the content of 10.0 wt. % or less should be selected.

What is claimed is:

1. A method of forming an expanded grid for an electrode plate of a lead-acid battery, comprising the steps of:

integrating a layer of a lead alloy containing at least one of tin and antimony at least on one side of a parent material made of lead or lead-calcium system alloy to form a clad sheet, forming a slit in said clad sheet to obtain a grid; and twisting said grid so that the layer of the lead alloy containing at least one of tin and antimony is spirally oriented in multiple directions.

2. A method of forming an expanded grid for an electrode plate of lead-acid battery according to claim 1, wherein the clad sheet is formed by overlaying a sheet of said lead alloy containing at least one of tin and antimony on the parent material made of lead or lead-calcium system alloy, and integrating the sheet and the parent material by cold rolling.

3. A method of forming an expanded grid for an electrode plate of lead-acid battery according to claim 1, wherein the content of tin and antimony in the lead alloy containing at least one of tin and antimony is in a range of 1.0 wt. % or more and 10.0 wt. % or less.

* * * * *